United States Patent [19]

Kraus

[11] 4,409,635
[45] Oct. 11, 1983

[54] ELECTRICAL POWER SYSTEM WITH FAULT TOLERANT CONTROL UNIT

[75] Inventor: Mark G. Kraus, Churchill Boro, Pa.

[73] Assignee: Westinghouse Electric Corp., Pittsburgh, Pa.

[21] Appl. No.: 275,425

[22] Filed: Jun. 18, 1981

[51] Int. Cl.³ ............................................. H02H 7/26
[52] U.S. Cl. .......................................... 361/62; 361/67; 361/86; 371/16; 307/76; 307/84; 307/86; 364/480; 364/483; 364/493; 364/186
[58] Field of Search ...................... 361/62, 65, 82, 87, 361/67, 86, 20, 21; 307/47, 51, 68, 76, 84–87, 64, 43; 371/20, 19, 16; 364/480, 483, 492, 493, 186

[56] References Cited

U.S. PATENT DOCUMENTS

| | | | |
|---|---|---|---|
| 3,609,312 | 9/1971 | Higgin et al. ................... | 364/186 X |
| 3,723,750 | 3/1973 | Dixon et al. ..................... | 307/84 X |
| 3,829,842 | 8/1974 | Langdon et al. ................ | 364/186 X |
| 3,842,249 | 10/1974 | Geyer et al. .................... | 364/186 X |
| 4,090,090 | 5/1978 | Johnston .......................... | 307/64 X |
| 4,107,253 | 8/1978 | Borg et al. ....................... | 246/182 B |
| 4,263,580 | 4/1981 | Sato et al. ....................... | 364/186 X |
| 4,275,311 | 6/1981 | Agazzone et al. .............. | 307/86 X |

Primary Examiner—Patrick R. Salce
Attorney, Agent, or Firm—R. P. Lenart

[57] ABSTRACT

A high reliability electrical power system is provided with a microprocessor-based control unit which maintains power output and performs control functions for the system which is driven by the power system. A self locking feature prevents the transmission of potentially erroneous control signals if a component of the system being controlled or the control unit fails. The control unit conducts a series of self-test routines which result in the generation of digital key words. If the correct key words are generated and the other circuits of the control unit are operating properly, the control unit output remains operative. If the self test routines detect a failure in the system being controlled or the control unit or if a failure occurs in one of the control unit output circuits, the control unit output is locked into a predetermined state.

16 Claims, 7 Drawing Figures

ELECTRICAL POWER SYSTEM WITH FAULT TOLERANT CONTROL UNIT

BACKGROUND AND SUMMARY OF THE INVENTION

This invention relates to electrical power systems and particularly to power systems for use in applications where a failure in the power system or its control unit must force the control unit output into a prescribed state. Control units used in such systems are also able to perform control functions for the circuit being driven by the power system and to force their control function outputs to a predetermined state when a failure occurs in the control unit or the system being controlled.

When a failure in an electrical system has the potential to expose life or property to extreme danger, it is essential that the system be closely controlled. Any failure in the system or the control unit should result in immediate corrective action. Various design techniques are available when designing an electrical system which contains highly reliable control functions. These techniques include backup logic circuits, voting schemes, and special data processing techniques.

In aircraft power distribution systems, the failure of a generator must be sensed by the control unit and an auxiliary generator must be switched into the system.

In addition, it is desirable to construct a control unit which minimizes weight and size but still has sufficient computational power to perform self-test fault detection functions. Once a fault in the control unit or the system being controlled occurs, a clear indication of the failure is required and a positive means for locking the failed device out of the system must be used.

The present invention seeks to provide a highly reliable electrical system and means for forcing a desired system response when a failure occurs in the control unit of the remainder of the system. In part, the objectives of this invention have been addressed by the prior art. For example, U.S. Pat. No. 4,107,253, Aug. 15, 1978, by Borg et al. discloses a railway signaling system safety and test device which generates an output voltage through the use of a read only memory and comparator circuit. However, that patent explicitly allows for the continued operation of the control unit once the correct operating conditions have been established, even if an intermittent fault has occurred. Therefore, under certain fault conditions, the output voltage could exhibit periodic cycling. Such an intermittent failure response is highly undesirable in certain applications. This invention provides a unique method of preventing such failure response modes by locking the failed system in a predetermined output state so that any future erroneous control signals are ignored by the system.

The control unit of the present invention comprises a microprocessor, digital comparator, read only memory, output means for producing control signals, and a feedback circuit which implements the locking feature of the system. These components cooperate to perform various self-test routines which evaluate the operating condition of the system components and generate an output voltage when all test results are satisfactory and each element of the system being controlled and the control unit is functioning properly. The control unit utilizes a sequential key word technique to provide a highly reliable means of failure detection.

The microprocessor software is divided into two categories: operational software which relates to the processing of data received from outside of the control unit; and a collection of self-test routines which exercise all aspects of the control unit to reveal both passive and active failures. Selection of a particular self-test routine to be performed is determined by a digitally encoded base word stored in the read only memory.

The memory has two outputs: data A, which is a collection of base words that determine the self-test routine to be performed by the microprocessor; and data B, which is a collection of key control words used to verify results of the self-test routine. To begin the self-verification process within the control unit, the microprocessor reads a base word from memory output data A. That base word indicates the particular self-test routine which is to be performed by the microprocessor. After the test routine is completed, the test results appear in the form of a digitally encoded key word at output data C of the microprocessor. This occurs at a fixed time ($T_L$) after the microprocessor reads the base word.

A comparator then compares the key word appearing at the data C output of the microprocessor with the key word appearing at the data B output of the read only memory. If these key words are identical, the comparator output switches from a logic zero to a logic one. This change in logic state is sensed by a feedback circuit which indexes the read only memory, after a fixed time ($T_L$), to the next base word (data A) and key word (data B). Once the memory has been indexed, the key words appearing at data B and data C are no longer identical, so the comparator output switches back to a logic zero.

The appearance of a second base word on data A triggers a new self-test routine within the microprocessor, which results in the appearance of a new key word at data C of the microprocessor after a fixed time ($T_L$). If this new key word agrees with the current data B key word output, the comparator output again switches from a logic zero to a logic one and the feedback circuit subsequently indexes the read only memory to the next position. As long as the self-test routines continue to result in key words at data C which are identical to the key words at data B, the comparator output will continue to oscillate, remaining at logic one for a fixed time ($T_L$), then shifting to logic zero to remain there for the same length of time.

This results in a square wave at the comparator output which is used by the output stage of the control unit to generate an output voltage signal ($V_X$) which indicates that the control unit is functioning properly. The presence of output voltage signal $V_X$ enables the operational software output of microprocessor, allowing the control unit to perform its designated control functions in the total system.

Should any component fail, either in the microprocessor or in the other control unit circuitry, the net effect will be a loss of $V_X$. A failure in the microprocessor will result in a corruption of data C or its timing. Likewise, a failure in the comparator, memory, or feedback circuit will affect data B, and hence the input signal to the control unit output circuitry. Since $V_X$ is generated from an active pulse train, a failure in the control unit output circuitry will also result in a loss of $V_X$.

A power system constructed in accordance with the present invention incorporates a plurality of generators which can be switched in and out of the circuit by means of circuit breakers which are operated by a plurality of system control units. These control units would continually monitor the function of all aspects of the system and switch generators in and out of the circuit if a failure is found in a control unit or the system being controlled. Therefore the failed circuit would be locked out of the system while power output is continued. Manual intervention would be required to correct the failure.

Control units can also communicate with the circuit being driven by the power system by way of interface circuits which are designed to permit the control unit to test their operating condition through the self-test routines. If a failure is detected by the self-test routines, and the control unit outputs are locked, the information available at the data outputs could be used for maintenance purposes to locate the problem area.

DESCRIPTION OF THE PREFERRED EMBODIMENTS

Figure 1:
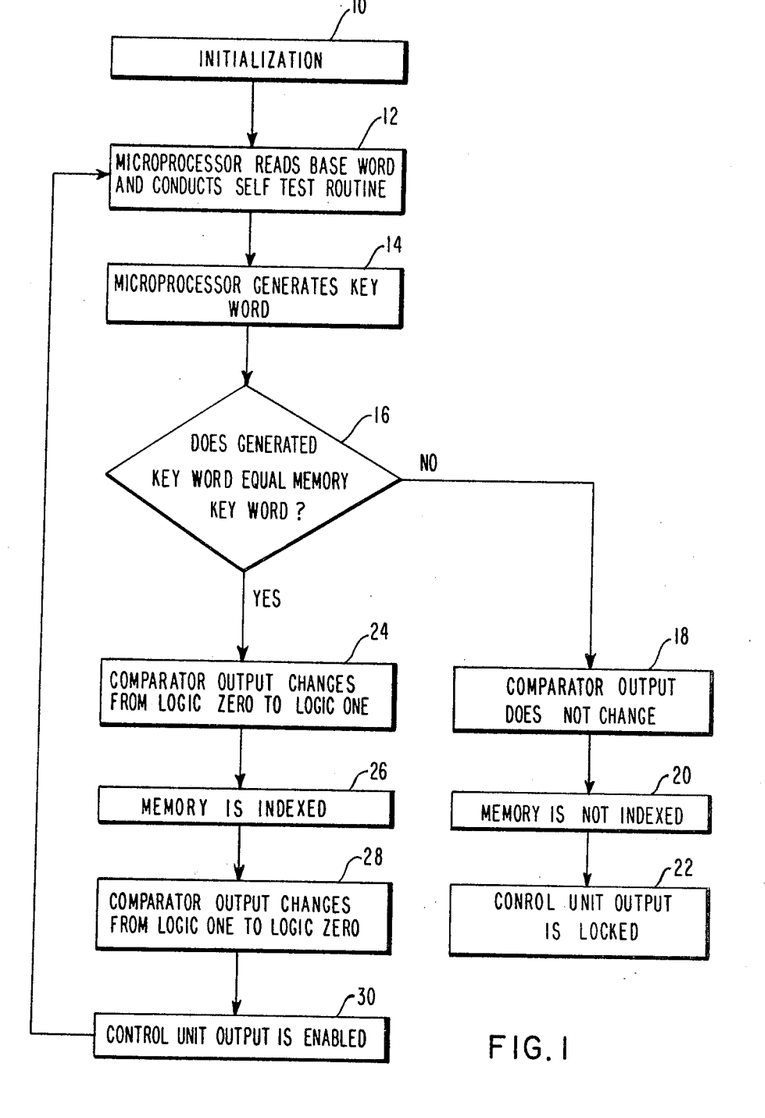
FIG. 1 is an illustrative flow chart of the control unit operation in accordance with a form of the present invention.

The illustrative flow chart of FIG. 1 gives an overview of the self-testing key and lock features of the present invention control unit. Reference will be made to the blocks of FIG. 1 in conjunction with a discussion of the control unit elements of FIG. 2, to provide a clear presentation of the relationships between the elements in addition to a description of the elements.

Figure 2:
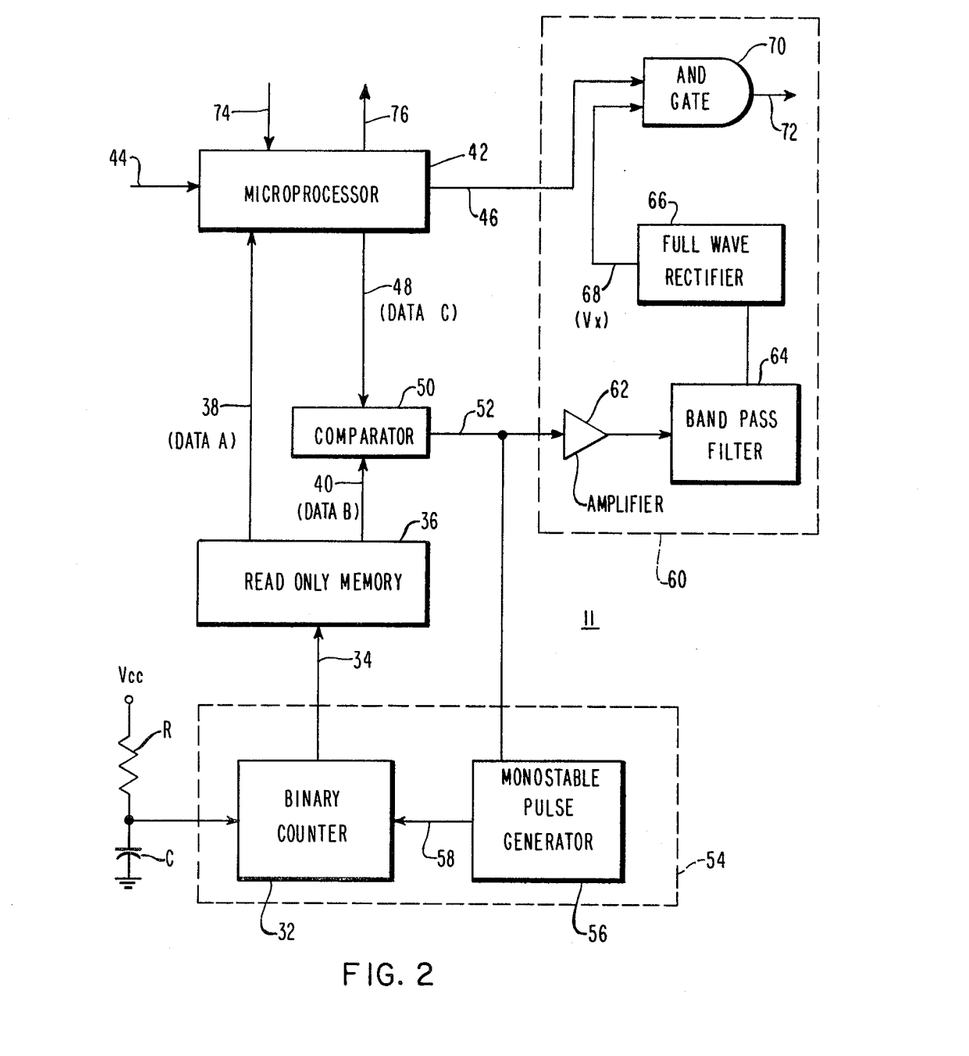
FIG. 2 is a block diagram representation of an embodiment of the present invention control unit.

As shown in block 10, the control unit 11 is initialized each time power is applied to it. The appearance of power supply voltage $V_{cc}$ across a branch circuit comprising resistor R and capacitor C presents a voltage pulse to the reset input of binary counter 32. This resets the output of binary counter 32 so that a binary equivalent of one appears on data line 34. This causes read only memory 36 to be indexed to its first output position. Read only memory 36 contains two sets of digitally encoded data, a collection of base words and a collection of key words. The base words are used by the control unit microprocessor 42 to determine the particular preprogrammed self test routine which is to be performed. The key words are used to determine whether or not the results of the self test routines are satisfactory. After initialization, the first base word appears on data line 38 (data A) and the first key word on data line 40 (data B).

Block 12 of FIG. 1 shows that the next step is for the microprocessor 42 to read the base word on data line 38. This base word typically consists of eight bits and identifies the preprogrammed self-test routine to be executed by the microprocessor. The self-test routine uses the base word in a sequence of tests, in such a manner that a set number of bit locations, typically four, will change their value relative to the starting base word. As shown in block 14, the result of this test sequence will be a data control word called key #1 which will appear on data line 48 (data C) after time $T_L$. At that time key #1 will be latched into the microprocessor output for data line 48, leaving the microprocessor free to receive inputs from the system being controlled via data line 44 and to perform its designated system control functions, outputting a control signal onto data line 46.

The comparator 50 compares the microprocessor generated key #1 on data line 48 (data C) with the key word received from memory 36 via data line 40 (data B). This comparison is shown in block 16 of FIG. 1. If the key words on data lines 40 and 48 are not equivalent, block 18 of FIG. 1 shows that there is no change in the comparator output data line 52. As a result, blocks 20 and 22 show that the memory 36 will not be indexed and the control unit output 72 will be locked into a predetermined state, which is a logic zero in this embodiment. Details of the locking mechanism will become clear when the remainder of the circuit is discussed below.

If the key words on data lines 40 and 48 are equivalent, the comparator 50 will change its output state from a logic zero to a logic one on data line 52. This causes feedback circuit 54 comprising monostable pulse generator 56 and binary counter 32 to index memory 36 after time $T_L$ so that the next base word will appear on data line 38 and the next key word will appear on data line 40. When this occurs, the key words on data lines 40 and 48 will no longer be equivalent, and the output of comparator 50 will revert back to a logic zero. This sequence is shown by blocks 24, 26, and 28 in FIG. 1. At the same time, the microprocessor will be processing the next self-test routine according to the base word on data line 38.

The mechanism used by feedback circuit 54 to index memory 36 requires some further explanation. When comparator output data line 52 changes from a logic zero to a logic one, monostable pulse generator 56 is triggered and produces a pulse of duration $T_L$ on data line 58. Binary counter 32 is updated by the trailing edge of that pulse. Therefore after time $T_L$, data line 34 changes to the next binary number and memory 36 is indexed accordingly.

When data lines 38 and 40 are changed as a result of the memory 36 being indexed, the old key word is still latched in the output of microprocessor on data line 48. Therefore, the key words on data lines 40 and 48 are no longer equivalent and the comparator output data line reverts to a logic zero. It remains in that state until the microprocessor compeletes the next self-test routine and outputs a new key word on data line 48 after time $T_L$. If this word is equivalent to the key word on line 40, the comparator output data line will again change from a logic zero to a logic one, and the feedback circuit 54 will update memory 36 again.

Figure 3:
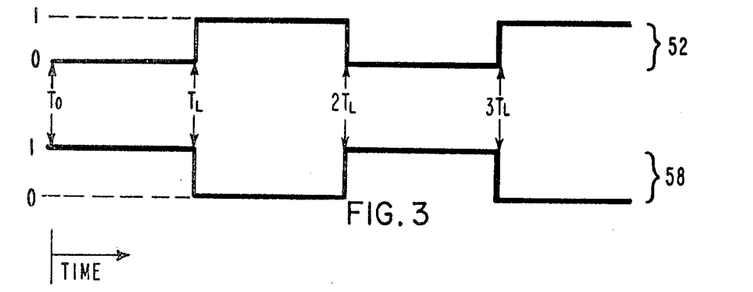
FIG. 3 is a timing diagram descriptive of the signals associated with the control unit of FIG. 2.

It should be apparent that as long as the microprocessor continues to successfully execute self-test routines and output correct key words, data line 52 will change logic states after each time interval $T_L$. This results in a square wave of frequency $\frac{1}{2}T_L$ as shown by wave form 52 in FIG. 3. The wave form of data line 58 is also shown in FIG. 3 for a case where the monostable pulse generator produces a negative going pulse and times out after a period equal to $T_L$. The wave forms of FIG. 3 illustrate a case where the control unit is initialized at $T_o$, the microprocessor outputs a correct key word at $T_L$, the memory is updated at $2T_L$, and the microprocessor outputs a second correct key word at $3T_L$.

The square wave on data line 52, which results from successful completion of self-test routines and successful key word comparisons, is received by the control unit output circuitry 60. There it is amplified by amplifier 62, and passed through band-pass filter 64 and full wave rectifier 66 to produce a direct current voltage signal ($V_X$) on data line 68. The presence of a positive voltage ($V_X$) on data line 68 enables the control unit output as in block 30, allowing AND gate 70 to pass positive voltage signals on data line 46 onto data line 72. Data line 72 serves as the output for all control functions performed by the microprocessor on system data received via data line 44. It should be apparent to those skilled in the art that a plurality of microprocessor output data lines 46 and a plurality of AND gates can be used to provide multiple simultaneous control signals on data line 72.

For the present invention control unit to be able to self-test all of the system functions, interface circuits which provide self-testing features must be used. Microprocessor 42 uses data lines 74 and 76 to receive and send self test signals for evaluating the performance of these circuits. Examples of such interface circuits are shown in FIGS. 4, 5, and 6.

Figure 4:
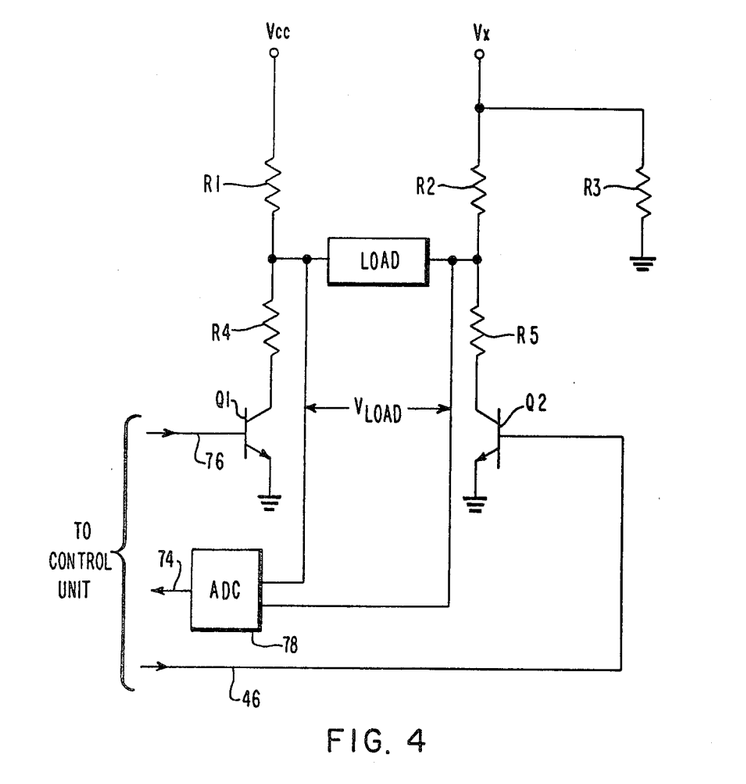
FIGS. 4 through 6 are sample interface circuits to be used in conjunction with the control unit of FIG. 2.

FIG. 4 shows an interface circuit which can be substituted for AND gate 70 of FIG. 2, when the voltage applied to the load is normally zero, but is greater than some minimum voltage ($V_o$) when the control unit energizes the interface circuit, or when the control unit fails. Under normal conditions, supply voltage $V_{cc}$ is present but transistors Q1 and Q2 are off. In order to test the operation of this circuit, the control unit would perform a self-test routine which simultaneously turns on Q1 and Q2 via data lines 76 and 46, measures the voltage across the load ($V_{LOAD}$), then simultaneously turns off Q1 and Q2 and measures $V_{LOAD}$ again. It should be apparent that the control unit microprocessor can be programmed to use these two voltage measurements to detect failures in the interface circuit or the load. An analog to digital converter 78 is used to convert the load voltage to a digital signal which can be used by the microprocessor.

If the control unit fails, $V_X$ becomes zero, it should be apparent that by the proper choice of resistor values, $V_{LOAD}$ can be forced to a condition in which it is greater than $V_o$ even if Q1 or Q2 or both fail open or short. If the control unit is operating properly, it can perform its assigned control function of applying voltage to the load by turning Q2 on, while Q1 remains off.

Figure 5:
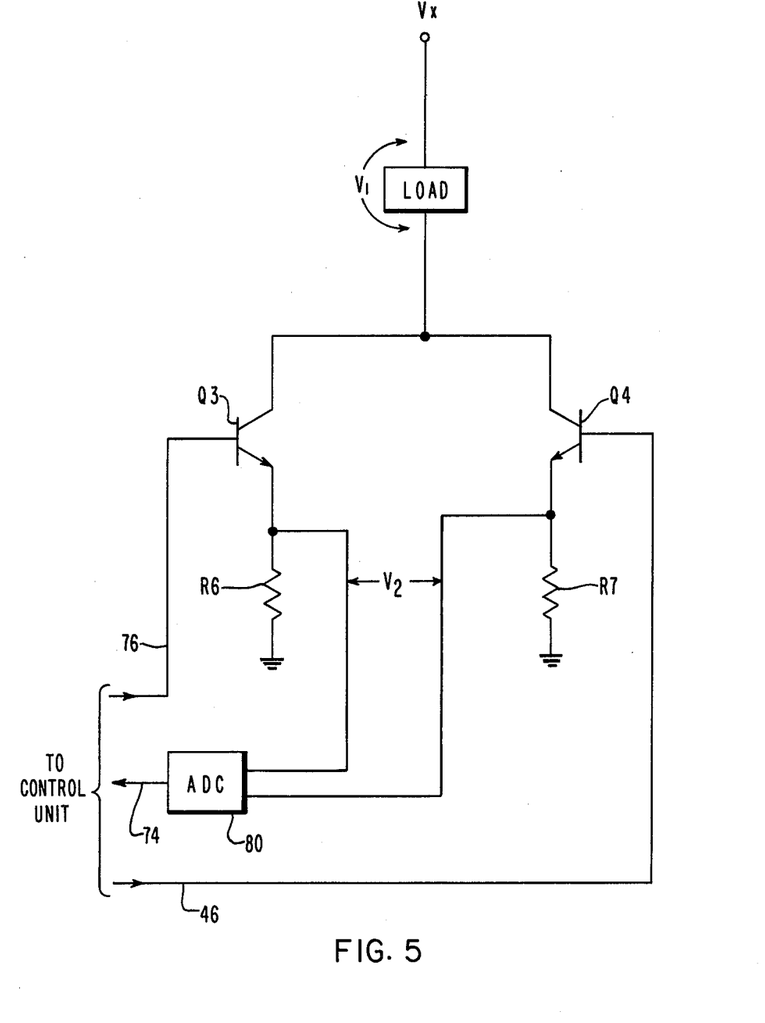
Figure 6:
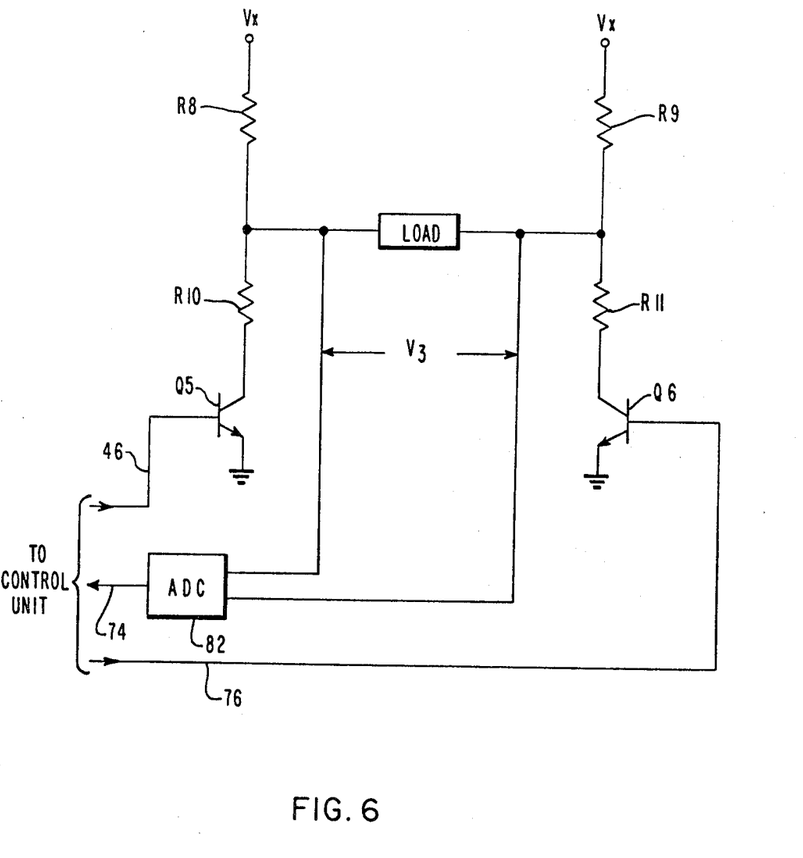

FIG. 5 shows a system interface circuit which can be substituted for AND gate 70 of FIG. 2 where a voltage ($V_1$) normally appears across a load, but must be turned off if the control unit fails. Under normal operation, Q4 is on and Q3 is off. When the control unit is functioning properly, it can turn off $V_1$ by turning off both Q3 and Q4.

A self-test routine can test the operation of this circuit by turning on both Q3 and Q4 and measuring the voltage $V_2$. Then Q4 would be turned off while Q3 remains on and $V_2$ would be measured again. The voltage measurements are converted to a digital signal by analog to digital converter 80. From these two voltage measurements, it should be apparent that the control unit microprocessor can be programmed to detect a failure in this interface circuit. If the control unit fails, $V_X$ would be reduced to zero and load voltage $V_1$ would also go to zero.

FIG. 6 shows an interface circuit which can be substituted for AND gate 70 of FIG. 2 where the load voltage ($V_3$) is normally zero and must remain at zero if the control unit fails. Since a failure in the control unit reduces $V_X$ to zero, it should be apparent that this would also reduce $V_3$ to zero zince no voltage would be supplied to this circuit. This voltage is monitored via data line 74 after being converted to a digital signal by analog to digital converter 82. When the control unit is functioning properly, it can perform its assigned control function by turning on either Q5 or Q6. The self-test routine for this circuit would be identical to the self-test routine for the interface circuit of FIG. 4.

Figure 7:
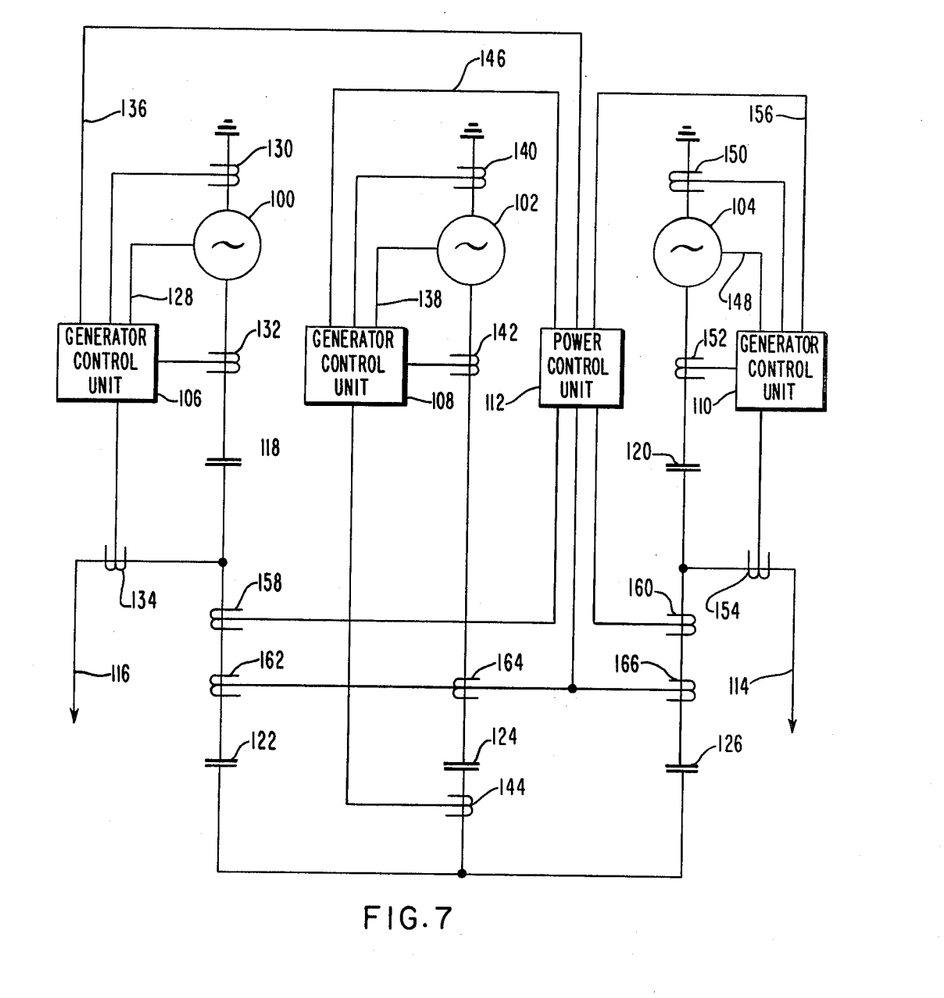
FIG. 7 is a one line diagram of a power system designed in accordance with the present invention.

FIG. 7 shows a one-line diagram of an embodiment of the present invention power system with three independent generators 100, 102, and 104. Generator control units 106, 108, and 110 and bus power control unit 112 monitor the system and ensure that power is delivered to the right bus 114 and left bus 116 under normal conditions and when any single circuit failure occurs.

Contactors 118, 120, and 124 are normally closed while contactors 122 and 126 are normally open. Therefore under normal conditions, generator 100 supplies power to left bus 116 and generator 104 supplies power to right bus 114.

Each control unit in FIG. 7 is constructed in accordance with FIG. 2. Control unit 106 monitors the performance of generator 100 via data line 128. It also monitors the wiring between ground and left bus 116 by comparing the circuit measured by current transformers 130, 132, and 134. If the parameters on data line 128 reveal a failure in generator 100; the current measured by current transformers 130, 132, and 134 is not uniform, indicating a wiring failure; or the self test routine of control unit 106 discovers a failure in control unit 106; then contol unit 106 will lock into an output state which will open contactor 118 and inform control unit 112 via data line 136 that a fault has occurred. Control unit 112 would respond by closing contactor 122 so that generator 102 supplies power to left bus 116.

Control unit 108 will monitor the function of generator 102 via data line 138. The wiring between ground and left bus 116 will be monitored by control unit 108 by measuring the current with current transformers 140, 142, and 144. A failure in generator 102, its associated wiring, or control unit 108 would result in contactor 124 being opened and control unit 112 being informed of the failure via data line 146.

Control unit 110 performs functions similar to those of control unit 106, but for circuits associated with right bus 114. The function of generator 104 is monitored via data line 148 and the wiring between ground and right bus 114 is monitored via current transformers 150, 152, and 154. A failure in generator 104, the associated wiring, or control unit 110 would result in contactor 120 being locked open and control unit 112 being informed of the failure via data line 156. Control unit 112 would respond by closing contactor 126 so that generator 102 can supply power to right bus 114.

Control unit 112 monitors current via current transformers 158 and 160 to determine if contactor 122 or 126 is closed. Current transformers 162, 164, and 166 are monitored simultaneously and wired such that any failure in bus wiring between them will produce a signal at control unit 112 indicating that corrective action is necessary.

It should be apparent that the power system described in this embodiment will maintain power on the left and right bus under normal conditions and after a failure in any component of the system. Two independent failures could result in a loss of power to at least one of the buses. Additional generators and control units can be added to the system to add protection against multiple failures without departing from the scope of the present invention.

While a preferred embodiment of the present invention has been described, it will be obvious to those skilled in the art that various changes may also be made in the control unit embodiment without departing from the invention. Such changes include, but are not limited to, the use of alternate system interface circuits which provide for self testing; the use of a switch in series with the resistor capacitor circuit branch of FIG. 1, to provide manual reset capability; or the use of alternate feedback circuit components.

What is claimed is:

1. An electrical power system comprising:
    a plurality of generators;
    a plurality of contactors individually connected in series with the output of said generators and a plurality of power buses;
    computer means having input means for receiving information signals and output means for delivering digitally encoded information signals;
    said computer means being adapted to treat said received information signals in accordance with a predetermined program and to produce said digitally encoded output information signals;
    said computer means being further adapted to run through a self-test program and to generate a digital control word at the end of each test program sequence after a fixed time interval following the initiation of said self-test program, wherein said control word encodes the test program results;
    a memory for storing predetermined digitally encoded messages and self-test routine instructions in a given sequence and outputting said messages and said self-test routine instructions;
    a comparator for comparing said predetermined digitally encoded messages from said memory means and said digitally encoded control words from said computer means, producing an output signal at a first logic level when said messages are equivalent to said control words and producing an output signal at a second logic level when said messages are not equivalent to said control words;
    means for initializing said memory such that a selected predetermined digitally encoded message appears at the output of said memory when electrical power is applied to the control unit;
    feedback means responsive to a transition in said comparator means output signal which delivers signals to said memory means for the purpose of indexing said predetermined digitally encoded messages and self-test routine instructions after said fixed time interval following the occurrence of said transition; and
    output means responsive to said comparator means for controlling said contactors in accordance with said computer means output information signals when the comparator means output signal periodically switches between said first and second logic levels to define a square wave, and for driving said contactors into a predetermined state when the comparator means output signal fails to define a square wave.

2. An electrical power system as recited in claim 1, wherein said means for initializing said memory means comprises:
    a branch circuit connected between an external electrical power source and ground;
    a reset input terminal on said memory; and
    said branch circuit comprising a resistor and a capacitor, connection in series wherein the junction between said resistor and said capacitor is electrically connected to said memory reset terminal.

3. An electrical power system as recited in claim 2, further comprising a switch in series with said resistor and said capacitor in said branch circuit, for manually resetting the control unit.

4. An electrical power system as recited in claim 1, wherein the steps included in said self-test program sequence are determined by the information contained in said memory self-test routine instructions.

5. An electrical power system as recited in claim 1, wherein said feedback means comprises:
    a one shot monostable pulse generator which generates a voltage pulse when said comparator indicates that said predetermined digitally encoded messages from said memory are equivalent to said digitally encoded output signals from said computer means; and
    a binary counter which receives said voltage pulse from said pulse generator and delivers an output signal to said memory for selecting which of the predetermined digitally encoded messages will be delivered to said comparator and said computer means.

6. An electrical power system as recited in claim 5, wherein said one shot monostable pulse generator output pulse has a pulse width equivalent to the time interval between said computer means receipt of self-test routine instructions and said computer means outputting said computer generated control word, such that said comparator output signal will be a square wave when successively generated computer control words are equivalent to said memory control words.

7. An electrical power system as recited in claim 1, wherein said output means comprises:
    an amplifier which amplifies said comparator output signal;
    a band-pass filter which filters said amplified comparator output signal;
    a full wave rectifier which converts said amplified and filtered comparator output signal to a direct voltage; and
    a means responsive to said direct voltage for transmitting said digital encoded output information signals.

8. An electrical power system as recited in claim 7, wherein said transmitting means is a logic gate.

9. A fault tolerant electronic control unit comprising:
    computer means having input means for receiving information signals and output means for delivering digitally encoded information signals;
    said computer means being adapted to treat said received information signals in accordance with a predetermined program and to produce said digitally encoded output information signals;
    said computer means being further adapted to run through a self-test program and to generate a digital control word at the end of each test program sequence after a fixed time interval following the initiation of said self-test program wherein said control word encodes the test program results;
    a memory for storing predetermined digitally encoded messages and self-test routine instructions in a given sequence and outputting said messages and said self-test routine instructions;

a comparator for comparing said predetermined digitally encoded messages from said memory means and said digitally encoded control words from said computer means, producing an output signal at a first logic level when said messages are equivalent to said control words and producing an output signal at a second logic level when said messages are not equivalent to said control words;

output means responsive to said comparator means for producing a first output control signal in accordance with said computer means output information signals, when the comparator means output signal periodically switches between said first and second logic levels to define a square wave and for producing a predetermined second output control signal when the comparator means output signal fails to define a square wave;

means for initializing said memory such that a selected predetermined digitally encoded message appears at the output of said memory when electrical power is applied to the control unit; and feedback means responsive to a transition in said comparator means output signal which delivers signals to said memory means for the purpose of indexing said predetermined digitally encoded messages and self-test routine instructions after said fixed time interval following the ocurrence of said transition.

10. A fault tolerant electronic control unit as recited in claim 9, wherein said means for initializing said memory means comprises:

a branch circuit connected between an external electrical power source and ground;

a reset input terminal on said memory; and said branch circuit comprising a resistor and a capacitor connected in series, wherein the junction between said resistor and said capacitor is electrically connected to said memory reset terminal.

11. A fault tolerant electronic control unit as recited in claim 10, further comprising a switch in series with said resistor and said capacitor in said branch circuit, for manually resetting the control unit.

12. A fault tolerant electronic control unit as recited in claim 9, wherein the steps included in said self-test program sequence are determined by the information contained in said memory self-test routine instructions.

13. A fault tolerant electronic control unit as recited in claim 12, wherein said feedback means comprises:

a one shot monostable pulse generator which generates a voltage pulse when said comparator indicates that said predetermined digitally encoded messages from said memory are equivalent to said digitally encoded output signals from said computer means; and a binary counter which receives said voltage pulse from said pulse generator and delivers an output signal to said memory for selecting which of the predetermined digitally encoded messages will be delivered to said comparator and said computer means.

14. A fault tolerant electronic control unit as recited in claim 13, wherein said one shot monostable pulse generator output pulse has a pulse width equivalent to the time interval between said computer means receipt of self-test routine instructions and said computer means outputting said computer generated control word, such that said comparator output signal will be a square wave when successively generated computer control words are equivalent to said memory control words.

15. A fault tolerant control unit as recited in claim 9, wherein said output means comprises:

an amplifier which amplifies said comparator output signal;

a band-pass filter which filters said amplified comparator output signal;

a full wave rectifier which converts said amplified and filtered comparator output signal to a direct voltage; and a means responsive said direct voltage for transmitting said digital encoded output information signals.

16. A fault tolerant control unit as recited in claim 15, wherein said transmitting means is a logic gate.

* * * * *